(12) United States Patent
Rossi et al.

(10) Patent No.: US 12,492,865 B2
(45) Date of Patent: Dec. 9, 2025

(54) MULTI-CHAMBER DRYER USING ADJUSTABLE CONDITIONED AIR FLOW

(71) Applicant: E. & J. Gallo Winery, Modesto, CA (US)

(72) Inventors: Joseph Rossi, Fresno, CA (US); Richard Magoon, Tacoma, WA (US); Steven J. Anderson, Modesto, CA (US)

(73) Assignee: E. & J. Gallo Winery, Modesto, CA (US)

( * ) Notice: Subject to any disclaimer, the term of this patent is extended or adjusted under 35 U.S.C. 154(b) by 573 days.

(21) Appl. No.: 17/558,221

(22) Filed: Dec. 21, 2021

(65) Prior Publication Data

US 2022/0113087 A1    Apr. 14, 2022

Related U.S. Application Data

(63) Continuation of application No. 14/217,103, filed on Mar. 17, 2014, now Pat. No. 11,226,155.
(Continued)

(51) Int. Cl.
*F26B 3/20*  (2006.01)
*F26B 17/04*  (2006.01)
(Continued)

(52) U.S. Cl.
CPC ............. *F26B 3/20* (2013.01); *F26B 17/04* (2013.01); *F26B 21/004* (2013.01); *F26B 25/10* (2013.01)

(58) Field of Classification Search
CPC ........ F26B 17/04; F26B 21/004; F26B 25/10; F26B 3/20
See application file for complete search history.

(56) References Cited

U.S. PATENT DOCUMENTS 1,405,781 A * 2/1922 Gordon ................... F26B 17/04
                                                                34/566
1,881,063 A   10/1932 Randolph
(Continued)

FOREIGN PATENT DOCUMENTS

CA    2589260 A1    6/2006
CA    2906926       9/2014
(Continued)

OTHER PUBLICATIONS

U.S. Appl. No. 18/364,762, filed Aug. 3, 2023, Natural Crystalline Colorant and Process for Production, Rossi.
(Continued)

*Primary Examiner* — Michael G Hoang
*Assistant Examiner* — Logan P Jones
(74) *Attorney, Agent, or Firm* — Dentons US LLP

(57) ABSTRACT

A multi-chamber dryer using adjustable conditioned air flow is disclosed. According to one embodiment, an apparatus includes a drying belt configured to receive a product to be dried on a first surface of the drying belt and a heat medium in contact with a second surface of the drying belt. The heat medium is configured to heat the product and is maintained at a pre-determined temperature. The apparatus further includes a manifold that is positioned above the drying belt, where the manifold includes one or more orifices that inject conditioned air laterally across a width of the drying belt to remove evaporated water from the product

14 Claims, 8 Drawing Sheets

Related U.S. Application Data

(60) Provisional application No. 61/791,939, filed on Mar. 15, 2013.

(51) Int. Cl.
*F26B 21/00* (2006.01)
*F26B 25/10* (2006.01)
*F26B 25/00* (2006.01)

(56) References Cited

U.S. PATENT DOCUMENTS

| | | | |
|---|---|---|---|
| 1,988,031 A | 1/1935 | Barnett | |
| 2,134,906 A | 11/1938 | Byron | |
| 2,235,559 A | 3/1941 | Mayer | |
| 2,437,492 A * | 3/1948 | Walter | B01J 19/06 165/104.31 |
| 2,844,359 A * | 7/1958 | Annerhed | F25D 13/062 62/380 |
| 2,911,732 A | 11/1959 | Webb | |
| 3,108,402 A | 10/1963 | Henry | |
| 3,150,005 A | 9/1964 | Oleson | |
| 3,151,950 A * | 10/1964 | Newman | B05D 3/02 34/267 |
| 3,206,866 A | 9/1965 | McCabe | |
| 3,217,421 A | 11/1965 | Lowe | |
| 3,228,113 A * | 1/1966 | Fannon, Jr. | F26B 3/305 34/216 |
| 3,250,315 A | 5/1966 | Osborne et al. | |
| 3,258,467 A | 6/1966 | Anderson et al. | |
| 3,266,559 A | 8/1966 | Osborne | |
| 3,307,270 A | 3/1967 | Kruger | |
| 3,341,949 A * | 9/1967 | Flaith | F26B 25/008 34/218 |
| 3,436,791 A | 4/1969 | Chambon | |
| 3,570,576 A | 3/1971 | Griffon | |
| 3,641,681 A | 2/1972 | Brock | |
| 3,805,316 A | 4/1974 | Sheppard | |
| 3,915,691 A | 10/1975 | Sakagami et al. | |
| 4,067,318 A * | 1/1978 | Flaith | F26B 17/04 34/208 |
| 4,127,947 A | 12/1978 | Webb et al. | |
| 4,152,842 A | 5/1979 | Laughlin | |
| 4,259,063 A | 3/1981 | Spirin et al. | |
| 4,306,358 A * | 12/1981 | King, Jr. | F26B 3/20 68/5 D |
| 4,452,822 A | 6/1984 | Shrikhande | |
| 4,631,837 A * | 12/1986 | Magoon | F26B 17/04 34/95 |
| 4,664,061 A | 5/1987 | Morioka et al. | |
| 4,763,572 A | 8/1988 | Kuehl | |
| 5,052,313 A | 10/1991 | Walker | |
| 5,098,790 A | 3/1992 | Diemunsch et al. | |
| 5,238,503 A | 8/1993 | Phenix et al. | |
| 5,617,647 A | 4/1997 | Okane et al. | |
| 5,632,097 A | 5/1997 | Snitchler et al. | |
| 5,743,022 A | 4/1998 | Hall et al. | |
| 5,884,769 A | 3/1999 | Anderson | |
| 6,047,484 A | 4/2000 | Bolland et al. | |
| 6,112,677 A | 9/2000 | Kuntschar et al. | |
| 6,195,913 B1 * | 3/2001 | Canet | A23N 12/08 34/589 |
| 6,230,421 B1 | 5/2001 | Reed, Sr. et al. | |
| 6,269,550 B1 | 8/2001 | Martin | |
| 6,468,573 B1 | 10/2002 | Herrick et al. | |
| 6,497,107 B2 | 12/2002 | Maisotsenko et al. | |
| 6,539,645 B2 | 4/2003 | Savarese | |
| 6,688,018 B2 | 2/2004 | Soucy | |
| 6,742,277 B2 | 6/2004 | Sakurazawa | |
| 6,990,748 B2 | 1/2006 | Magoon et al. | |
| 6,990,751 B2 | 1/2006 | Riley et al. | |
| 7,208,181 B1 | 4/2007 | King et al. | |
| 7,211,413 B2 | 5/2007 | Matsumoto et al. | |
| 7,325,331 B2 | 2/2008 | Luukkanen | |
| 7,572,468 B1 | 8/2009 | Ishida et al. | |
| 8,464,437 B1 | 6/2013 | Weisselberg | |
| 8,826,558 B2 | 9/2014 | Priebe et al. | |
| 8,889,054 B2 | 11/2014 | Cakmak et al. | |
| 8,984,763 B2 | 3/2015 | Savarese | |
| 9,068,777 B2 | 6/2015 | Savarese | |
| 9,718,065 B1 | 8/2017 | Cilia | |
| 9,829,249 B2 | 11/2017 | Tice | |
| 9,863,704 B2 | 1/2018 | Vild | |
| 10,335,720 B2 | 7/2019 | Pomerleau | |
| 11,221,179 B2 | 1/2022 | Ortiz et al. | |
| 2002/0055471 A1 | 5/2002 | Bailey et al. | |
| 2002/0082459 A1 | 6/2002 | Bailey et al. | |
| 2002/0095818 A1 | 7/2002 | Jain et al. | |
| 2003/0041780 A1 | 3/2003 | Isager et al. | |
| 2004/0191384 A1 | 9/2004 | Naik et al. | |
| 2004/0194337 A1 | 10/2004 | Gasparini et al. | |
| 2004/0231186 A1 | 11/2004 | Kolb et al. | |
| 2005/0068774 A1 | 3/2005 | Pippa et al. | |
| 2005/0115099 A1 | 6/2005 | Magoon et al. | |
| 2005/0175720 A1 | 8/2005 | McKenzie | |
| 2005/0181101 A1 | 8/2005 | Harada et al. | |
| 2005/0249837 A1 | 11/2005 | Massimino et al. | |
| 2006/0272174 A1 | 12/2006 | Hartig | |
| 2007/0082399 A1 | 4/2007 | Egorova-Zachernyuk | |
| 2007/0104842 A1 | 5/2007 | Margolis et al. | |
| 2007/0110857 A1 | 5/2007 | Hartal et al. | |
| 2007/0294911 A1 | 12/2007 | Wilson | |
| 2008/0075824 A1 | 3/2008 | Biehl | |
| 2008/0087168 A1 | 4/2008 | Wright et al. | |
| 2008/0201978 A1 | 8/2008 | Hammer | |
| 2008/0260915 A1 * | 10/2008 | Alkayali | A23J 3/04 426/96 |
| 2009/0226589 A1 | 9/2009 | Ferreira | |
| 2009/0246315 A1 | 10/2009 | Barnekow et al. | |
| 2010/0048957 A1 | 2/2010 | Kim | |
| 2010/0145116 A1 | 6/2010 | Van Keulen et al. | |
| 2012/0076904 A1 | 3/2012 | Sinha et al. | |
| 2012/0151790 A1 | 6/2012 | Savarese | |
| 2013/0122146 A1 | 5/2013 | Ghaedian et al. | |
| 2014/0202028 A1 | 7/2014 | De Santos Avila et al. | |
| 2014/0259725 A1 | 9/2014 | Rossi et al. | |
| 2017/0079933 A1 | 3/2017 | Whittle et al. | |
| 2017/0227288 A1 | 8/2017 | Pardo | |
| 2018/0045462 A1 | 2/2018 | Baeghbali et al. | |
| 2018/0156539 A1 | 6/2018 | Baudouin et al. | |
| 2019/0336521 A1 | 11/2019 | Kotra et al. | |
| 2020/0009109 A1 | 1/2020 | Macaluso et al. | |
| 2020/0132370 A1 | 4/2020 | Ortiz et al. | |
| 2022/0090857 A1 | 3/2022 | Ortiz et al. | |
| 2022/0228805 A1 | 7/2022 | Jolly | |

FOREIGN PATENT DOCUMENTS

| | | | |
|---|---|---|---|
| CA | 2987089 A1 | 12/2016 | |
| CA | 3085863 A1 | 6/2018 | |
| CA | 3115497 A1 | 4/2020 | |
| CN | 1323541 A | 11/2001 | |
| CN | 1986539 A | 6/2007 | |
| CN | 201184732 Y | 1/2009 | |
| CN | 105378412 A | 3/2016 | |
| CN | 107388803 A | 11/2017 | |
| CN | 109996551 A | 7/2019 | |
| DE | 499308 C * | 6/1930 | |
| DE | 19740858 C1 * | 10/1998 | B01D 1/18 |
| EP | 0542669 A1 | 5/1993 | |
| EP | 0695510 A1 | 2/1996 | |
| EP | 2725925 B1 | 5/2014 | |
| EP | 3009394 A1 | 4/2016 | |
| EP | 3369783 A1 | 9/2018 | |
| FR | 2399467 A1 | 3/1979 | |
| FR | 3037640 A1 | 12/2016 | |
| GB | 499539 A | 1/1939 | |
| GB | 554930 A | 7/1943 | |
| GB | 570827 A | 7/1945 | |
| GB | 785584 A | 10/1957 | |
| GB | 1236866 A * | 6/1971 | |
| JP | S53125433 A | 11/1978 | |
| JP | S57153702 A | 9/1982 | |
| JP | S60248981 A | 12/1985 | |

(56) References Cited

FOREIGN PATENT DOCUMENTS

| | | |
|---|---|---|
| JP | S61223481 A | 10/1986 |
| JP | H04209515 A | 7/1992 |
| JP | H7304976 A | 11/1995 |
| JP | H1015358 A | 1/1998 |
| JP | H1151562 A | 2/1999 |
| JP | 2004293942 A | 10/2004 |
| JP | 2005082588 A | 3/2005 |
| JP | 2006506448 A | 2/2006 |
| JP | 2006230272 A | 9/2006 |
| JP | 2008521403 A | 6/2008 |
| JP | 2009508877 A | 3/2009 |
| JP | 2009531316 A | 9/2009 |
| JP | 2009531330 A | 9/2009 |
| JP | 2012145281 A | 8/2012 |
| JP | 5185098 B2 | 4/2013 |
| JP | 2015-74489 A | 4/2015 |
| WO | WO-2002077105 A1 | 10/2002 |
| WO | WO-03079816 A1 | 10/2003 |
| WO | WO-2006058222 A2 | 6/2006 |
| WO | WO-2008004206 A2 | 1/2008 |
| WO | WO-2010139746 A2 | 12/2010 |
| WO | WO-2012/009469 A2 | 1/2012 |
| WO | WO-2012/079094 A1 | 6/2012 |
| WO | WO-2013/003616 A1 | 1/2013 |
| WO | WO-2014145952 A1 | 9/2014 |
| WO | WO-2015/052872 A1 | 4/2015 |
| WO | WO-2016203170 A1 | 12/2016 |
| WO | WO-2018061009 A1 | 4/2018 |
| WO | WO-2019119153 A1 | 6/2019 |
| WO | WO-2019211797 A1 | 11/2019 |
| WO | WO-2020086957 A1 | 4/2020 |
| WO | WO-2021022298 A2 | 2/2021 |

OTHER PUBLICATIONS

U.S. Appl. No. 18/351,038, filed Jul. 12, 2023, Low Profile Dersign Air Tunnel System and Method for Providing Uniform Air Flow in a Refractance Window Dryer, Ortiz.
U.S. Appl. No. 18/473,522, filed Sep. 25, 2023, Mobile Refractance Window Dryer, Ortiz.
U.S. Appl. No. 17/154,953, filed Jan. 21, 2021, Methods for Processing Plant Materials and Producing Dried Products, Ortiz.
U.S. Appl. No. 18/451,402, filed Aug. 17, 2023, Cannabinoid Emulsions and Complexes and Related Methods of Manufacture, Kelm.
U.S. Appl. No. 17/201,978, filed Mar. 15, 2021, Natural Crystalline Colorant and Process for Production, Rossi.
U.S. Appl. No. 17/708,949, filed Mar. 30, 2022, Natural Crystalline Colorant and Process for Production, Rossi.
U.S. Appl. No. 18/093,126, filed Jan. 4, 2023, Natural Crystalline Colorant and Process for Production, Rossi.
U.S. Appl. No. 17/542,197, filed Dec. 3, 2021, Low Profile Design Air Tunnel System and Method for Providing Uniform Air Flow in a Refractance Window Dryer, Ortiz.
Abonyi, B. I. et al., "Quality retention in strawberry and carrot purees dried with refractance window system," JFS: Food Engineering and Physical Properties, 2001, 67(2):1051-1056.
Abul-Fadl, M.M. and Ghanem, T.H., "Effect of Refractance-Window (RW) Drying Method on Quality Criteria of Produced Tomato Powder as Compared to the Convection Drying Method," World Applied Sciences Journal, 2011, 15(7):953-965.
Buckton G, Darcy P. Assessment of disorder in crystalline powders—a review of analytical techniques and their application. Int J Pharm. Mar. 15, 1999;179(2):141-58.
Commission Regulation (EU) No. 231/2012 of Mar. 9, 2012 laying down specifications for food additives listed in Annexes II and III to Regulation (EC) No. 1333/2008 of the European Parliament and of the Council Text with EEA relevance.
Hartel, Richard, "Crystallization in Foods," Aspen Publication, 2001, 32 pages.

International Search Report and Written Opinion for PCT/US2021/014461 dated May 13, 2021 (21 pages).
Nindo, C., "Novel drying method for Vegetables, Fruits, Herbs, and Aquatic Resources," The Canadian Society for Bioengineering, 2008, 9 pages.
Wikipedia—Carminic acid, 2023, 5 pages.
Shao, J; Zydney, A, "Optimization of Ultrafiltration/Diafiltration Processes for Partially Bound Impurities", *Biotechnology and Bioengineering*, 87/3, pp. 286-292, Jul. 7, 2004.
SUNLITE Flat Multiwall Polycarbonate Sheet. Palram., {Mar. 4, 2013), URL: https://web.archive.org/Web/20130304050051/http://www.palram.com/SUNLITE, (Jul. 7, 2014), XP055281823.
Ayhan, Topuz et al; Influence of different drying methods of carotenoids and capsaicinoids of paprika (CV jalapeno) Food Chemistry, Elsevier LtD, NL, vol. 129, No. 3; Nat 5, 2011, pp. 860-865.
Bolland: Refractance Window Food Drying System Delivers Quality Product Efficiently, Jul. 21, 2000; Retrieved from the Internet: URL:https://www.foodonline.com/doc/refractance-window-food-drying-system-deliver-0001, retrieved on Jun. 29, 2018.
Buskov et al, Separation of chlorophylls and their degradation products using packed column supercritical fluid chromatography (SFC) HRC, Journal of High Resolution Chromatography (1999), vol. 22, No. 6, pp. 339-342.
Caparino et al., "Effect of drying methods on the physical properties and microstructures of mango (*Philippine 'arabao'* var.) powder",, Journal of Food Engineering 111 (2012).
Careri, Supercritical fluid extraction for liquid chromatographic determination of carotenoids in Spirulina Pacifica algae: a chemometric approach. Journal of chromatography. A, (Mar. 30, 2001) vol. 912, No. 1, pp. 61-71 (Year: 2001).
Clarke, Phillip, Refractance Window TM Down Under, Jan. 1, 2004, pp. 813-820, XPO55489211, Retrieved from the internet: URL: http://files.gwdryer.com/dryer-technology-comparison.pdf—Retrieved on Jun. 29, 2018, Chapter: "The Refractance Windows Process"; p. 814.
European Search Report issued on Jul. 6, 2018 in corresponding EP Application No. EP18154793 filed on Feb. 1, 2018.
Hossain, Concentration of anthocyanin pigments in blackcurrant pomace by ultrafiltration. Food Australia (2003), vol. 55, No. 6, pp. 263-266.
Ide et al, Ultrafiltration with spiral wound membrane technology. Official Proceedings—International Water Conference (1990), 51st, 362-73.
International Search Report and Written Opinion for International Patent Application No. PCT/US2014/030810, dated Aug. 20, 2014 (8 Pages).
International Search Report and Written Opinion for International Patent Application No. PCT/US2019/058055, dated Jan. 10, 2020 (8 pages).
International Search Report issued Jul. 12, 2012 in corresponding PCT Application No. PCT/US2012/046687, filed Jun. 28, 2012, inventor(s) Rossi, Joseph et al.
Lionetto, Effect of the daily ingestion of a purified anthocyanin extract from grape skin on rat serum antioxidant capacity. Physiological research/ Academia Scientiarum Bohemoslovaca, (2011) vol. 60, No. 4, pp. 637-645. Electronic Publication Date: May 16, 2011.
Nindo et al., Refractance window dehydration technology: a novel contact drying method. Drying Technology (2007), 25(1-3), 37-48 (Year: 2007).
Office Action Issued on Aug. 21, 2018 by the Japanese Patent Office (JPO) in corresponding Japanese application No. 2017-126421 filed on Jun. 28, 2017.
Office Action Issued on Jul. 24, 2018 by the Japanese Patent Office (JPO) in corresponding Japanese application No. 2017-126401 filed on Jun. 8, 2017.
Office Action Issued on Sep. 5, 2018 by Canadian Intellectual Property Office (CIPO) in corresponding Canadian application No. 2,840,213 filed on Jun. 12, 2012.
Pavan, "Effects of freeze drying, refractive window drying and hot-air drying on the quality parameter of Acai", Master Thesis, University of Illinois, 2010.

(56) References Cited

OTHER PUBLICATIONS

Ravindra, Antioxidant activity of the anthocyanin from carrot (*Daucus carota*) callus culture. International journal of food sciences and nutrition, (Sep. 2003) vol. 54, No. 5, pp. 349-355.
Skerget et al, Separation of paprika components using dense CO2. Acta Alimentaria (Budapest) (1998), vol. 27, No. 2, pp. 149-160.
Thao et al,"Methods to characterize the structure of food powders", Bioscience, Biotechnology, and Biochemistry, vol. 81, Issue 4,Apr. 3, 2017.
Zhao, Yun-xia et al., Research on the purification and antioxidant activity of mulberry red pigment, Science and Technology of Food Industry, vol. 29, pp. 250-253 2008.
Zimmer, Membrane filtration: practical experience with juice pretreatment and filtration of coloured juices. Fruit Processing (2007), 17(3), 153-158.

* cited by examiner

MULTI-CHAMBER DRYER USING ADJUSTABLE CONDITIONED AIR FLOW

CROSS-REFERENCE TO RELATED APPLICATIONS

The present application is a continuation of U.S. Non-Provisional application Ser. No. 14/217,103, filed on Mar. 17, 2014, which claims the benefit of and priority to U.S. Provisional Patent Application Ser. No. 61/791,939, filed on Mar. 15, 2013, the entire contents of each of which are incorporated by reference.

FIELD

The present disclosure relates in general to the drying of a product. In particular, the present disclosure is directed to a multi-chamber dryer using adjustable conditioned air flow.

BACKGROUND

In a traditional drying system, the product to be dried is placed on a continuous belt that floats on the surface of a body of heated water. Heat is transferred by conduction from the circulated heated water directly to the product through a belt of a polymer membrane. The heated water is maintained at a pre-determined temperature to allow optimum drying of the product.

However, the traditional drying system utilizes a large volume of ambient air to remove water vapor released during the product drying process. The uncontrolled humidity and the temperature of ambient air within the dryer leads to a wide variation in dryer performance and product quality. For example, a dryer operating in a dry climate performs differently in a humid climate. Similarly, dryer performance varies in cold and hot climates, and from season-to-season at the same location.

Furthermore, the traditional drying system increases water vapor pressure in the product by increasing the product temperature due to thermal energy conducted from the body of heated water through the drying belt. However, the traditional drying system does not reduce water vapor pressure, increase the temperature of air within the dryer, or reduce the humidity of air within the dryer, all of which can improve dryer performance.

SUMMARY

A multi-chamber dryer using adjustable conditioned air flow is disclosed. According to one embodiment, an apparatus includes a drying belt configured to receive a product to be dried on a first surface of the drying belt, and a heat medium in contact with a second surface of the drying belt. The heat medium is configured to heat the product and is maintained at a pre-determined temperature. The apparatus further includes a manifold that is positioned above the drying belt, where the manifold includes one or more orifices that inject conditioned air laterally across a width of the drying belt to remove evaporated water from the product.

The above and other preferred features, including various novel details of implementation and combination of elements, will now be more particularly described with reference to the accompanying drawings and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles described herein.

Figure 1:
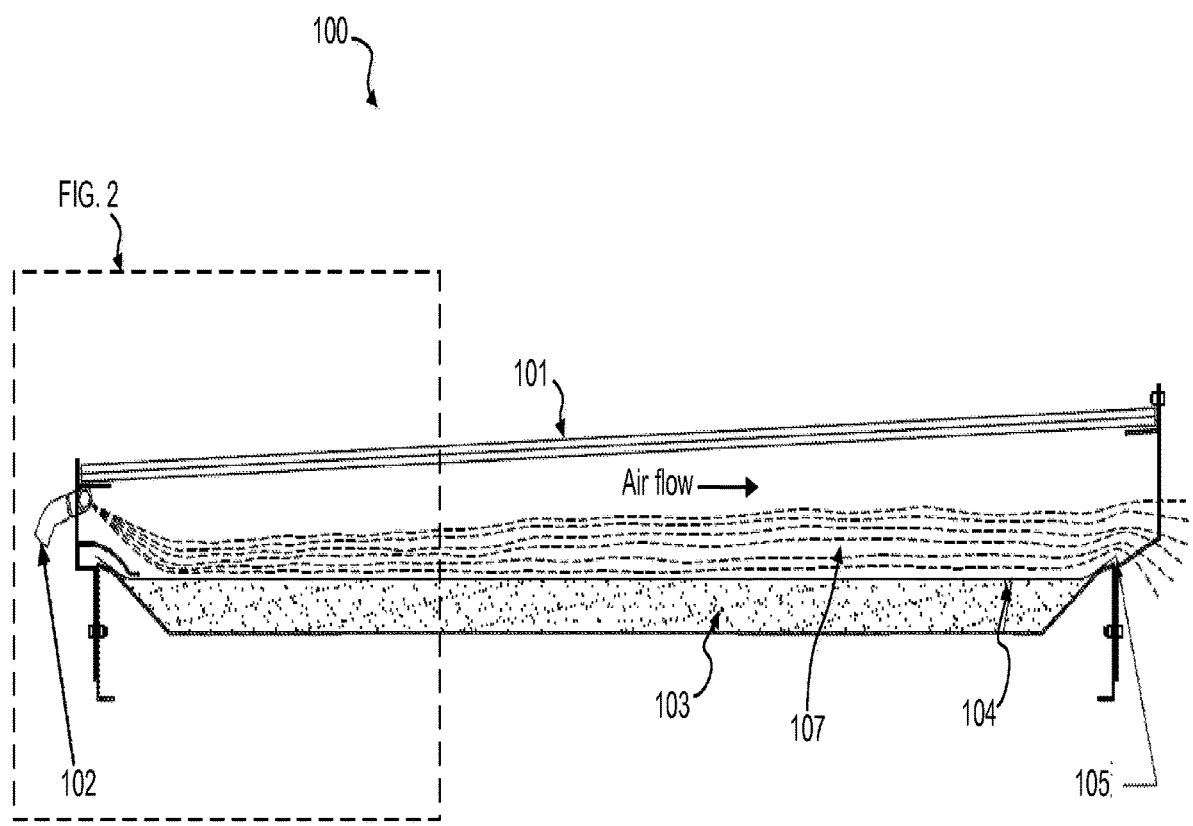
FIG. 1 illustrates a cross-sectional view of an exemplary dryer using a high pressure manifold, according to one embodiment.

It should be noted that the figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A multi-chamber dryer using adjustable conditioned air flow is disclosed. According to one embodiment, an apparatus includes a drying belt configured to receive a product to be dried on a first surface of the drying belt, and a heat medium in contact with a second surface of the drying belt. The heat medium is configured to heat the product and is maintained at a pre-determined temperature. The apparatus further includes a manifold that is positioned above the drying belt, where the manifold includes one or more orifices that inject conditioned air laterally across a width of the drying belt to remove evaporated water from the product.

Each of the features and teachings disclosed herein can be utilized separately or in conjunction with other features and teachings to provide a multi-chamber dryer using adjustable conditioned air flow. Representative examples utilizing many of these additional features and teaching, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

The present drying system dries a liquid or slurry product placed on a continuous drying belt by properly directing conditioned air laterally across the surface of the product, according to one embodiment. The present drying system includes a series of air distribution manifolds to direct conditioned air and an apparatus to improve product feed and removal. In one embodiment, high pressure air is distributed through orifices to optimize the drying process along the length of the dryer. In another embodiment, low pressure air is distributed though adjustable slots, or air knives, to control drying conditions along the length of the dryer.

According to one embodiment, the present drying system conditions air by de-humidifying air within a dryer to increase a drying rate and reduce dryer air requirements. The present drying system controls the humidity, temperature, and velocity of conditioned air to allow the dryer to ensure consistent product quality. According to one embodiment, air that is supplied to the dryer is de-humidified and filtered to meet a food grade standard or a pharmaceutical standard. The air volume required for drying is reduced by using a low profile dryer, thus simplifying an air inlet subsystem and an air exhaust subsystem of the present drying system while reducing machine cost. The present drying system captures exhaust air across the drying belt on the opposite side of the air distribution manifolds and discharges it from the dryer.

The present drying system increases and improves a dryer throughput at steady state operation. The present drying system improves heat transfer by providing faster water removal from a product surface on a drying belt, uses a simplified and less expensive air handling system, and improves the quality of the dried product with more consistent drying characteristics.

Description of General Dryer Operation

According to one embodiment, the present dryer includes a series of drying chambers with independently controlled water temperature, air flow rate, humidity and temperature. When a product to be dried on a drying belt enters a first chamber of the present dryer, the product temperature initially rises and water evaporation begins a few seconds after the product enters the present dryer. The present drying system adjusts air flow in the first drying chamber to allow the product temperature to reach a desired temperature for evaporation and to remove free water that evaporates easily from the product. The evaporation of bound water within the cell structure of the product (e.g., a nature product) requires the majority of a drying time of the product.

The present dryer may include one or more subsequent drying chambers that are farther than the first chamber from the entrance of the drying belt, according to one embodiment. A second drying chamber typically uses a lower air flow relative to the first chamber, according to one embodiment. This reduces an air velocity of the conditioned air and increases the product temperature. At this point, the majority of the free water from the product has evaporated. Bound water and cellular moisture within the product require more time to pass through the cell walls. The reduced air flow provides a higher product internal temperature and a higher vapor pressure. The present drying system allows the product to generate sufficient vapor pressure against the natural tendency to resist the passage of water vapor.

The present drying system includes a moving drying belt that floats or rides on a bath of heated water (e.g., 60° C. to 100° C.). In one embodiment, the drying belt may float on a bath of heat transfer fluid (e.g., for applications up to 125° C.). The present drying system applies a liquid or slurry product to the drying belt as a thin (e.g., less than 5 mm thick) layer of liquid. Heat is transferred by conduction from the circulated heated water (or heat transfer fluid) directly to the product through the drying belt of a polymer membrane to evaporate water from the product. The heated water or heat transfer fluid is maintained at a pre-determined temperature to allow optimum drying of the product. According to one embodiment, the drying belt is no more than 3 mm thick to ensure a rapid transfer of heat energy.

Conduction is a rapid and efficient mode of heat transfer compared to convection typically used in a traditional drying system. Conduction uniformly heats the product on the drying belt to a desired evaporation temperature. Evaporation occurs when the water vapor pressure in the product exceeds the water vapor pressure in the surrounding air.

Dryer Air Conditioning

According to one embodiment, the present drying system conditions air by reducing and controlling water content (i.e., de-humidifying) as well as controlling air temperature. This allows control of the dryer operating conditions to produce dried products with consistently high quality drying characteristics regardless of ambient conditions around the dryer.

The rate of evaporation for product drying is determined by the difference between the saturated water vapor pressure at the surface of a product and the water vapor pressure in the air above the product. The rate of evaporation can be increased by either increasing the water vapor pressure in the product, or reducing the water vapor pressure in the air above the product, or a combination of both.

The present drying system reduces the water vapor pressure of the dryer air, according to one embodiment. The present drying system de-humidifies the air within the dryer that is in contact with the product on the drying belt. The present drying system ensures that a continuous flow of de-humidified air replaces the evaporating water that is adjacent to the surface of the product. The present drying system replenishes the dryer with de-humidified air to maintain and control the rate of evaporation across the drying surface of the product and along the length of the drying belt.

Relative humidity is a function of the content of water present in the air and the temperature of the air. The capacity of air to hold moisture increases with temperature. When air is heated, the relative humidity decreases. According to one embodiment, the present drying system conditions the air within the dryer by lowering its relative humidity or de-humidifying the air. This is achieved by reducing the water content in the air, increasing the temperature of the air, or a combination of both. The combination of these two parameters increases the rate of evaporation in the dryer. The water content in the air may be reduced by the use of one or more of the following: (a) a chiller that removes condensed water vapor; (b) a solid absorbent (e.g., silica gel, activated alumina); (c) a compressor that causes moisture to condense;

and (d) any other standard technologies known to one skilled in the art. In one embodiment, the present drying system heats the de-humidified air to a desired temperature and introduces the heated de-humidified air into the dryer.

Based on the National Ambient Air Standards (40 CFR, Protection of the Environment, Chapter I, Part 50, Section 50.3, 1998), ambient air is defined as air at a 25° C. temperature and a 77% relative humidity. The quantity of water vapor in air is referred to as a humidity ratio, and the unit is grams of water/kilogram ($g_w/kg_{da}$) of dry air. The humidity ratio of ambient air is approximately 18 $g_w/kg_{da}$. According to one embodiment, the present drying system de-humidifies the air entering the dryer to reduce the humidity ratio below 10 $g_w/kg_{da}$ and preferably equal to or lower than 5 $g_w/kg_{da}$.

According to one embodiment, the present drying system de-humidifies the air entering the dryer by passing the air through a chiller to lower the temperature of the air to a temperature below the dew point when water is condensed and removed. The present drying system cools the air by using a refrigeration system. The evaporation cycle and the condensing cycle of the refrigeration system are used to achieve the desired air conditioning. Air is chilled across a heat exchanger that is the evaporator of the refrigeration system. Condensed water at the dew point is removed to reduce the water content in the air. Chilled air is then heated on the condensation cycle of the refrigeration system to produce de-humidified air. The present drying system may subsequently heat the de-humidified air by an additional heat source before introducing the heated de-humidified air into the dryer. The present drying system may use a cold loop and a hot loop from an evaporator and a condenser respectively to cool and reheat the air.

According to another embodiment, the present drying system de-humidifies the air entering the dryer by using a solid absorbent (e.g., silica gel, activated alumina). The present drying system may use silica gel as it is easily regenerated by heating. The present drying system passes the air through a chamber of silica gel. Silica gel of a smaller particle size is typically used as it is more efficient in capturing the water vapor present in the incoming air due to the higher surface area. In one embodiment, the present drying system uses silica gel between 20 to 40 mesh size. The air at ambient temperature passes through the silica gel and is de-humidified. The present drying system may further heat the de-humidified air to a desired temperature with a heat source before introducing the heated de-humidified air into the dryer. After the de-humidified air passes over the drying belt of the dryer, the moisture laden air is exhausted out of the dryer. According to one embodiment, the present drying system improves energy efficiency by using the exhausted air at elevated temperatures to pre-heat air to regenerate the silica gel. The present drying system may also regenerate the silica gel by an external source of heat energy (e.g., steam).

According to one embodiment, the present drying system de-humidifies the air entering the dryer by using an air compressor. The water holding capacity of air reduces with increasing pressure. During the compression cycle, water in the compressed air exceeds a saturation point, precipitates out as a condensate, and is subsequently removed from the compressor. In one embodiment, the present drying system compresses the air to a pressure greater than 1 bar, preferably greater than 5 bar and further preferred to be compressed to a pressure of 6 to 8 bar. As the system compresses and heats up the air to 8 bar and 36° C. respectively, the humidity ratio of the air reduces from 18 $g_w/kg_{da}$ to about 4.6 $g_w/kg_{da}$. Under such conditions, the compressed air is saturated (i.e., relative humidity is 100%), and water vapor above the dew point condenses as a liquid. The present drying system further expands the compressed air through an orifice or a pressure-reducing valve and returns the compressed air to atmospheric pressure at about 28° C. The humidity ratio remains at 4.6 $g_w/kg_{da}$ while the relative humidity reduces to about 20%. The present drying system may further heat the de-humidified air to a desired drying temperature prior to passing the heated de-humidified air over the drying belt.

In addition to reducing the absolute water content in the air, the present drying system increases the temperature of the de-humidified air to increase the difference between the saturated water vapor pressure and the product water vapor pressure. The de-humidified air may be heated to a temperature about 30° C. to 120° C. and preferably to about 40° C. to 60° C. The air that absorbs evaporated water released from the product has a higher humidity ratio and is discharged from the dryer. In one embodiment, the present drying system recycles the discharged air by de-humidifying and subsequently re-introducing the de-humidified air back into the dryer.

The present drying system further conditions the de-humidified air by passing the air through a high efficiency particulate air filter (HEPA) with a filter efficiency of at least 99.97%, according to one embodiment. The purified and conditioned air meets the ISO Class 8 specifications and is suitable for use in drying sterile products. The dryer of the present drying system is maintained at a slightly higher pressure than the surrounding area by using discharge dampers to prevent contaminants from entering and mixing with purified conditioned air, thus affecting the quality and composition of the finished dried product. In one embodiment, air that is exhausted from the dryer is filtered to avoid any product from the dryer from being released into the environment.

Dryer Air Flow

The present drying system provides a continuous flow of conditioned air laterally across a drying belt to ensure that the air is far from saturation (less than 50% relative humidity), thus sustaining a high rate of water evaporation across the drying belt. The present drying system optimizes the air flow across the surface of the product so that the average water vapor pressure of the air in contact with the surface of the product is maintained low.

The rate of the conditioned air flow across the drying belt is determined based on a rate of evaporation, a target average humidity ratio, and a relative humidity. As the product dries along the length of the drying belt, the rate of evaporation changes, and the velocity of the conditioned air changes proportionally. According to one embodiment, the target relative humidity ratio is below 10 $g_w/kg_{da}$, and preferably between 5 $g_w/kg_{da}$ and 8 $g_w/kg_{da}$. According to one embodiment, the air velocity is between 0.1 m/s and 60 m/s, and preferably between 2.0 m/s and 10 m/s.

According to one embodiment, the present drying system provides a manifold at a desired pressure and/or with a desired air volume based on a type of a product to be dried, a moisture content of the product, and/or a dryer configuration. For example, the present drying system provides a manifold that injects conditioned air at relatively higher pressure for a product with higher moisture content than a product with lower moisture content.

In another example, a first drying chamber that is nearer to the entrance of a drying belt evaporates most of the moisture from the product. The first drying chamber includes a manifold that injects conditioned air at higher pressure than a manifold of a second drying chamber that is farther from the entrance of the drying belt than the first drying chamber. The second drying chamber may further include a manifold that injects a smaller volume of conditioned air than the first drying chamber.

According to one embodiment, the present drying system provides conditioned air at a desired pressure based on a design of the manifold. For example, a manifold with smaller orifices injects conditioned air at higher pressure than a manifold with larger orifices.

According to one embodiment, the present drying system introduces conditioned air into the dryer by using either a high pressure (e.g., greater than 50 pounds per square inch gauge (psig)) manifold or a low (e.g., less than 5 psig) pressure manifold. FIG. 1 illustrates a cross-sectional view of an exemplary dryer using a high pressure manifold, according to one embodiment. The dryer 100 includes a polycarbonate cover 101 that provides a cover and headspace above a drying belt 104 for the dryer 100, a compressed air inlet distribution manifold 102 that introduces conditioned air 107 into the dryer 100, a heated medium 103, and an air outlet 105. The drying belt 104 floats above the heated medium 103. The heated medium 103 may include heated water or other forms of heat transfer fluid known in the art. The temperature of the heated water or other heat transfer fluids within the heated medium 103 is maintained at a pre-determined temperature. The dryer 100 applies a liquid or slurry product to the drying belt 104. The direction of product flow on the drying belt 104 is perpendicular to the direction of air flow of the conditioned air 107.

Figure 2:
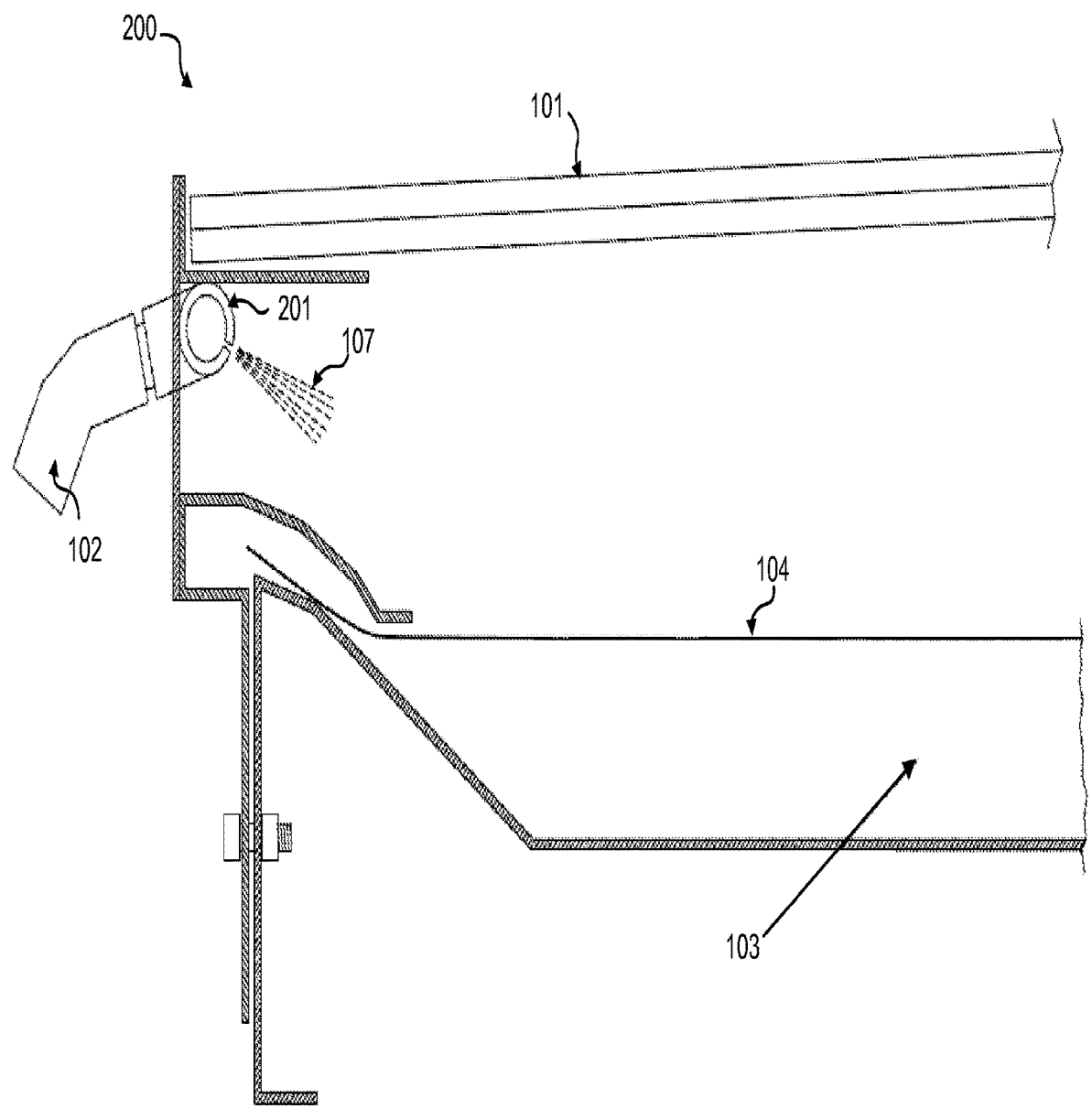
FIG. 2 illustrates a close-up cross-sectional view of an exemplary dryer using a high pressure manifold, according to one embodiment.

FIG. 2 illustrates a close-up cross-sectional view of an exemplary dryer using a high pressure manifold, according to one embodiment. The dryer 200 is a close-up cross-sectional view of the dryer 100, as illustrated in FIG. 1. The compressed air inlet distribution manifold 102 includes an inlet air orifice 201 that releases conditioned air 107 into the dryer 200. Although FIG. 2 only illustrates one inlet air orifice 201, the compressed air inlet distribution manifold 102 may include any number of inlet air orifices.

Figure 3:
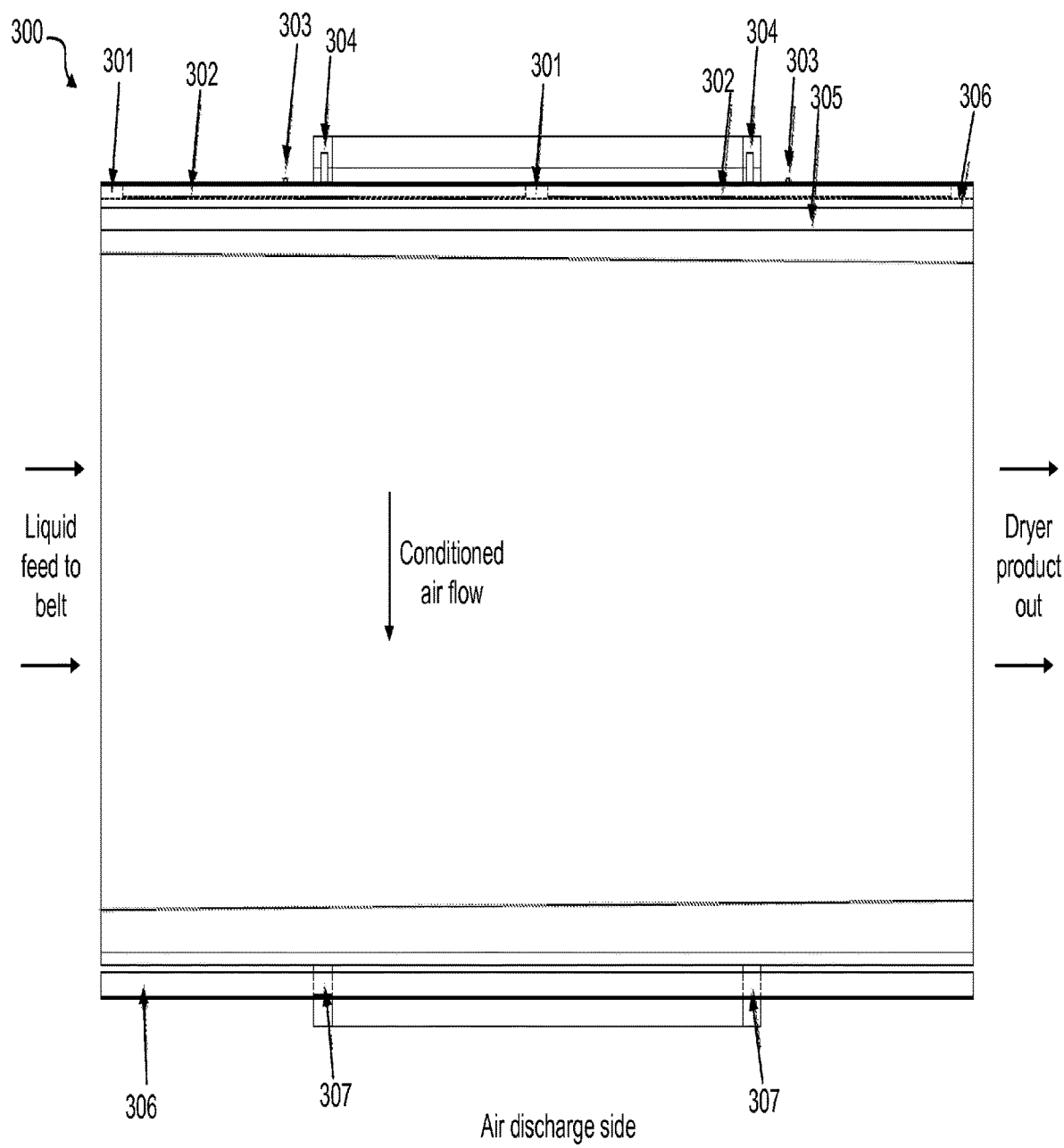
FIG. 3 illustrates a top view of an exemplary dryer, according to one embodiment.

FIG. 3 illustrates a top view of an exemplary dryer, according to one embodiment. The dryer 300 includes a U-shaped area 301, an air inlet manifold 302 that provides either high or low pressure conditioned air, a keyslot 303, an air fitting 304, an air baffle 305, a cover support 306, and a bracket 307. As illustrated in FIG. 3, the direction of conditioned air flow from the air inlet manifold 302 is perpendicular to the direction of the product to be dried that is moving on the conveyor drying belt.

Figure 4:
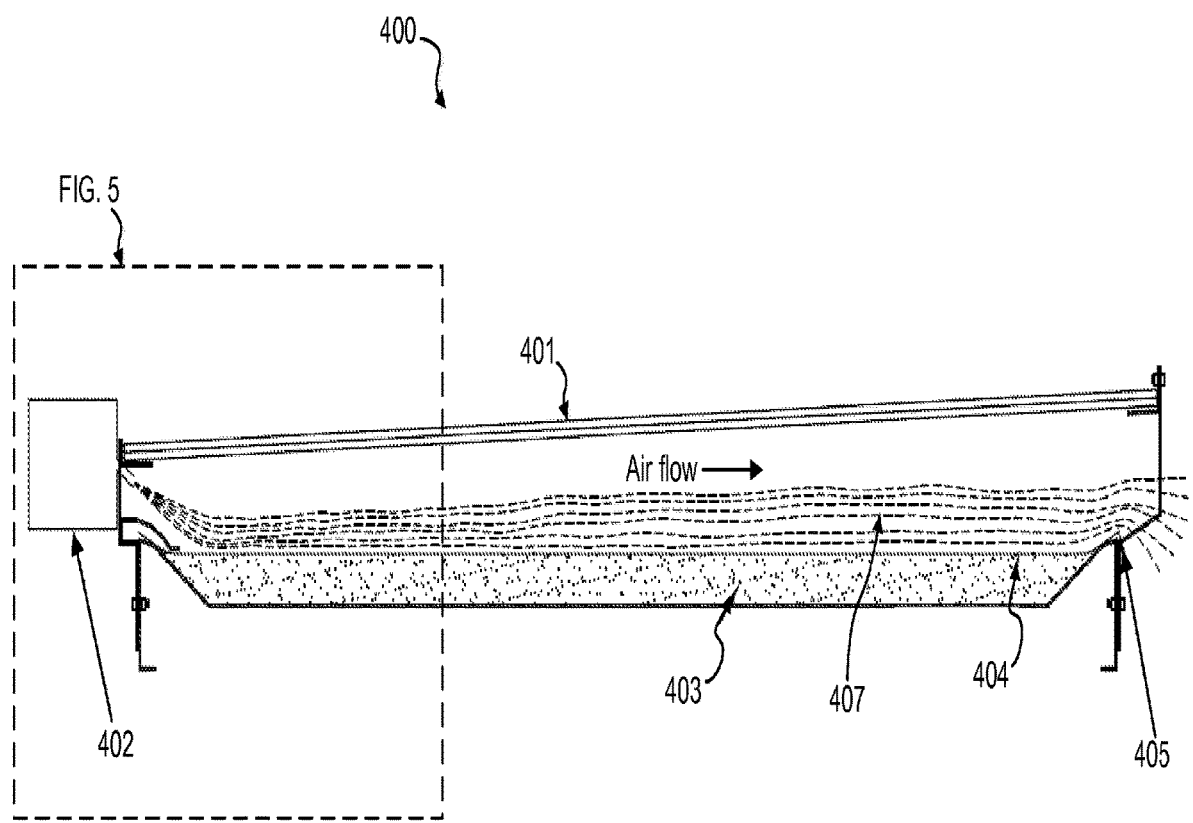
FIG. 4 illustrates a cross sectional view of an exemplary dryer using a low pressure manifold, according to one embodiment.

FIG. 4 illustrates a cross sectional view of an exemplary dryer using a low pressure manifold, according to one embodiment. The dryer 400 includes a polycarbonate cover 401 that provides a cover and headspace above a drying belt 404 for the dryer 400, a low pressure air inlet distribution manifold 402 that introduces conditioned air 407 into the dryer 400, a heated medium 403, and an air outlet 405. The drying belt 404 floats above the heated medium 403. The heated medium 403 may include heated water or other forms of heat transfer fluid known in the art. The temperature of the heated water or other heat transfer fluids within the heated medium 403 is maintained at a pre-determined temperature. The dryer 400 applies a liquid or slurry product to the drying belt 404. The direction of product flow on the drying belt 404 is perpendicular to the direction of air flow of the conditioned air 407.

Figure 5:
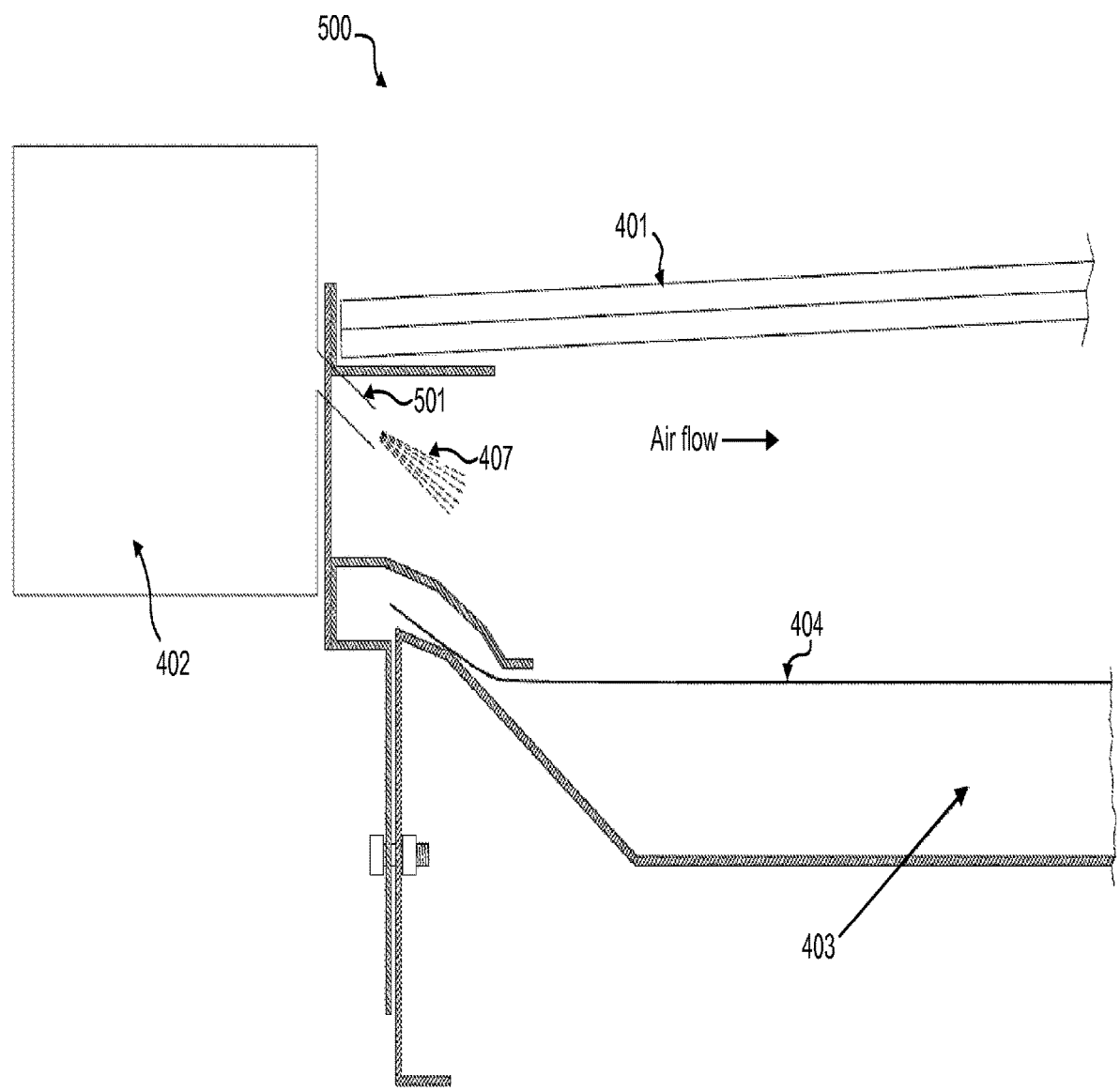
FIG. 5 illustrates a close-up cross-sectional view of an exemplary dryer using a low pressure manifold, according to one embodiment.

FIG. 5 illustrates a close-up cross-sectional view of an exemplary dryer using a low pressure manifold, according to one embodiment. The dryer 500 is a close-up cross-sectional view of the dryer 400, as illustrated in FIG. 4. The low pressure air inlet distribution manifold 402 includes an inlet air orifice 501 that releases conditioned air 407 into the dryer 500. Although FIG. 5 only illustrates one inlet air orifice 501, the low pressure air inlet distribution manifold 402 may include any number of inlet air orifices.

According to one embodiment, the present drying system controls the quantity of air that is injected into the dryer by adjusting the headspace above the drying belt and below the roof of the dryer. A lower headspace volume reduces the quantity of air that is required to be conditioned per unit time at the desired air velocity. The reduction of the headspace is limited by a practical space required to convey the product on the drying belt. According to one embodiment, the roof of the dryer is less than 800 mm above the drying belt and preferably between 10 mm and 100 mm above the drying belt. The roof of the dryer may be fitted with a transparent material to allow visibility and sampling, according to one embodiment.

Figure 6:
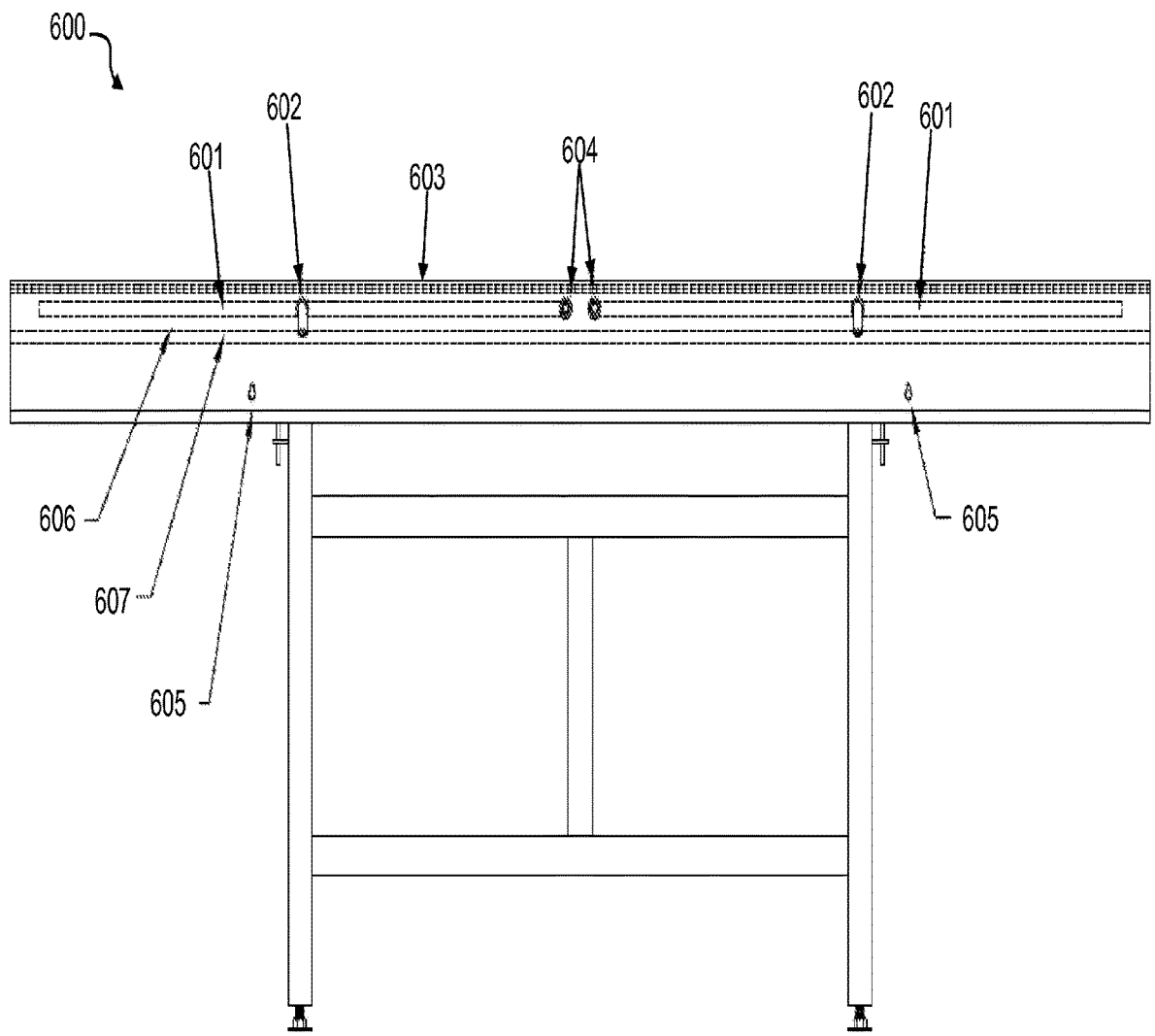
FIG. 6 illustrates a side view of an exemplary dryer, according to one embodiment.

FIG. 6 illustrates a side view of an exemplary dryer assembly, according to one embodiment. The dryer assembly 600 includes an air manifold 601, an air fitting 602, a polycarbonate cover 603, a port 604 for an air pressure gauge, a keyslot 605, an air baffle 606, and a U-shaped area 607.

Figure 7:
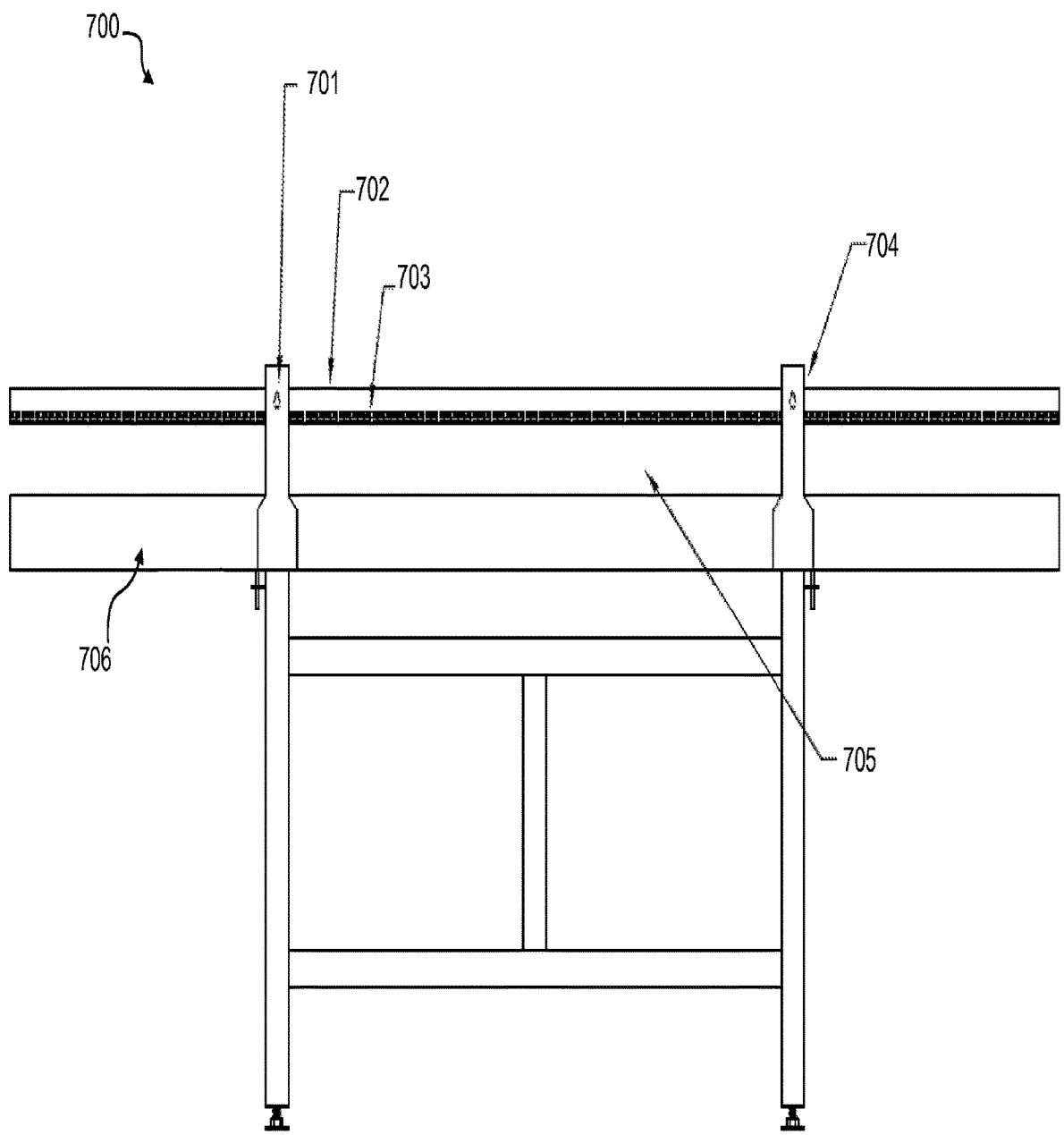
FIG. 7 illustrates another side view of an exemplary dryer, according to one embodiment.

FIG. 7 illustrates another side view of an exemplary dryer assembly, according to one embodiment. The dryer assembly 700 includes a cover support 702 with one or more keyslots 701, a polycarbonate cover 703, a bracket 704, a dryer 705 within the polycarbonate cover 703, and a drying belt 706. The polycarbonate cover 703 includes multi-wall poly carbonate panels that form a part of the dryer assembly and cover the top surface of the dryer assembly 700. The edges of the poly carbonate cover 703 are supported by the air shelf cover support 702 that provides a structural tie between the air distribution manifold and the panel support structure on the product vapor discharge side. The polycarbonate cover 703 prevents the entry of ambient air that may introduce undesirable contaminants. The polycarbonate cover 703 aids the control of conditioned air from the air distribution manifold across the drying product on the drying belt 706. According to one embodiment, the pressure within the dryer 705 is maintained at a positive pressure of at least 16 Pascal (Pa) above the pressure of the surrounding area around the dryer assembly 700.

Dryer Air Distribution Systems

According to one embodiment, high pressure air is directed into the dryer through orifices in a common manifold. Referring to FIG. 2, the compressed air inlet distribution manifold 102 includes the inlet air orifice 201 that injects high pressure air into the dryer 200 between the polycarbonate cover 101 and the drying belt 104. High velocity air passing across the drying belt 104 reduces the effective height of air flow above the drying surface of the product.

The injected air from the inlet air orifice 201 flows laterally across the drying surface of the product. The air flow rate, humidity, and temperature may be adjusted in each manifold depending on the product liquid matrix (e.g., low solids concentrate, high solids puree) by varying the number of orifices and line pressure.

According to one embodiment, conditioned air is introduced into the dryer through a series of orifices connected to a common manifold placed along the length of the dryer. The common manifold has several variable orifices that control air flow.

In one embodiment, air velocity is controlled by opening and closing orifices and by adjusting the air pressure in the manifold. The velocity and volume of the conditioned air can be adjusted for each dryer chamber within the dryer. The orifices are designed in such a way that the size of the opening can be varied, which in turn controls the overall quantity of air flow at any point along the length of the dryer.

In another embodiment, a sliding screen may be used to adjust air flow by partially or fully covering the orifice points. The air flow pattern may also be controlled to a predetermined pattern of orifices with a predetermined size, shape and frequency permanently fabricated into the manifold. According to one embodiment, the air in the manifold may be at a pressure between 10 psi to 150 psi, and preferably between 15 psi and 60 psi.

According to one embodiment, the orifices are designed without sharp edges. An orifice with a sharp edge tends to create eddies that disturb air flow close to the surface of the drying belt and increase the overall effective height of the air stream. Referring to FIG. 2, the inlet air orifice 201 is designed in such a way that the angle of incidence of the air stream over the drying belt 104 is no less than 40 degrees, according to one embodiment. The range of incident angle suited for effective drying is between 40 degrees and 85 degrees and preferably between 60 and 80 degrees, according to another embodiment.

The jet of conditioned air flow from the orifices may have a tendency to disturb the position of the drying belt or the heated water circulating underneath the drying belt. The present drying system avoids disturbing the position of the drying belt and the heated water by including a screen that is placed underneath the orifices and extends out beyond the edge of the drying belt. This screen guides the flow of the conditioned air from the orifices while preventing the conditioned air from disturbing either the water underneath or the position of the drying belt itself. If the conditioned air is directed laterally across the product surface, it may cause the drying belt to lift up due to the low pressure of the conditioned air stream. Both excessive air velocity and a misdirection of the airflow may cause lifting problems with the dryer belt.

The conditioned air that is injected by the orifices picks up moisture as it reaches the exhaust end across the width of the drying belt. According to one embodiment, the present drying system discharges the moisture laden air using a duct system. Several branch ducts originate along the length of the dryer on the opposite side of the air injection manifold. These branch ducts connect into a main exhaust duct that is connected to a suction end of a centrifugal blower. Air flow control dampers at each chamber balance air flow across the dryer. The exhaust air is filtered through at least a 5 micron sized filter to avoid any product from being released into the atmosphere.

By controlling the extent of opening of the orifices in the inlet air manifold and the position of the dampers in the air exhaust branch ducts, air flow can be adjusted across the dryer to a desired set point. Balancing the blowers and dampers allows the dryer to be maintained at a slight positive pressure relative to the atmospheric pressure. This ensures that contaminants do not enter the dryer and mix with the purified and conditioned dryer air.

According to one embodiment, the air flow along the length of the dryer is distributed through a series of low pressure ducts placed along the length of the dryer. Conditioned air is introduced into a dryer from one side and exhausted to the opposite side by flowing laterally across the product surface. Air is delivered to the dryer from a main duct that runs along the length of the dryer. Branch ducts are drawn from the main duct at several stages along the length of the dryer. Each duct includes one or more dampers to control the quantity of air flow to each chamber.

Air is passed through an air conditioning system to achieve a desired water content and a desired air temperature, prior to connection to the central duct that feeds the dryer. The air is also filtered through a HEPA filter to eliminate contaminants from entering the dryer.

The opposite side of the chamber includes corresponding exhaust ducts to capture moist air generated from the product drying surface. These exhaust ducts also include one or more air control dampers to control the velocity of the airflow out of the dryer. The exhaust air is flittered through at least a 5 micron sized filter to avoid any product from being released into the atmosphere.

By controlling the position of the dampers in the inlet and exhaust branches, the velocity of the air across the drying surface can be controlled to a desired set point. Balancing the blowers and dampers allows the dryer to be maintained at a slight positive pressure to the environment. This ensures that the contaminants do not enter the dryer and mix with the purified and conditioned dryer air.

Application of Product on Drying Belt

Surface tension is a measure of a cohesive force that attracts the molecules of a liquid together, causing the formation of droplets on a surface. This cohesive force varies depending on the air or a solid surface that is in contact with the liquid. The present drying system takes advantage of the difference between the surface tension at the liquid-air interface and the liquid-solid interface to determine how the liquid adheres to the drying belt.

According to one embodiment, as the drying belt returns to the product application side, the vertical portion of the drying belt rises and re-enters the dryer and is brought in contact with a pool of liquid product contained in a trough. The trough is pressed against the belt so that the open side directly contacts the drying belt. The cohesive force between the liquid and the solid forms a thin product layer on the drying belt as it rises and turns horizontal before entering the dryer. The layer formed is of even thickness across the width of the drying belt.

If the cohesive force between the product and the drying belt is excessive, the product is applied as a thick layer that can adversely impact drying performance. The present drying system controls or reduces the product thickness using a knife edge or a restriction at a desired thickness before the belt enters the dryer. The excess product may either be spread out evenly by a restriction or removed using a knife-edge so that the product layer of the desired thickness enters the dryer.

According to one embodiment, the present drying system applies a product with poor adhesion to the surface of the drying belt by sealing a pool of liquid product to the top of the horizontal portion of the drying belt, just before it enters the dryer. The pool of liquid product is held in a feeding container that stretches across the width of the drying belt whose bottom side serves as a seal against the moving drying belt. The belt is pressed between a flat surface at the bottom and the four walls of the feeding container. In one embodiment, the feeding container is made of a polymer that has a hardenability index equal to or less than that of the drying belt to ensure that the drying belt is not cut or scratched as it passes between the bottom flat surface and the feeding container.

The product is applied to the drying belt by adjusting the height of the wall on the downstream side of the trough slightly shorter than the remaining three side walls. This allows the present drying system to deliver a pre-determined quantity of product to the drying belt, at a predetermined thickness and evenly distributed across the width of the drying belt.

According to one embodiment, the present drying system applies a product with both poor flow characteristics and poor adhesion to the drying belt surface by slowly pouring the product out of a weir or an opening that stretches across the width of the drying belt at a desired rate. The velocity at which the drying belt is moving and the rate at which the product is being applied onto the drying belt determine the thickness of the layer of product.

Removal of Product from Drying Belt

According to one embodiment, the present drying system applies a product to the drying belt. The product on the drying belt travels the length of the dryer through a series of drying chambers. Heated water circulating underneath the drying belt heats the product. Evaporated water from the product is removed by a continuous flow of conditioned air across the surface of the product on the drying belt. The dried product adheres to the surface of the drying belt. The extent with which the dried product adheres onto the belt is dependent on the cohesive forces between the drying belt and the dried product. While some products weakly adhere to the belt, others adhere strongly and are difficult to remove. The present drying system removes the dried product from the drying belt by applying a force at an angle against the direction of the moving drying belt. The removing force is evenly applied across the width of the drying belt.

According to one embodiment, the present drying system removes the dried product by using a long circular or rectangular rod below the drying belt (on the non-contact surface) that has a sharp edge on one side. The rod may be made of a polymer that has a hardenability index lower than the drying belt material so as not to scratch the drying belt. The rounded edge may be made of a material that does not have any significant deformation when force is applied to remove the dried product. The stiffness of the surface supporting the drying belt ensures that the product across the entire surface is subjected to the same stress so that even forces are applied along the drying belt. This ensures that the drying belt does not begin to slide from side to side under the shifting resistance offered by the removing force. In one embodiment, the present drying system includes one singe rod or a set of multiple rods installed side by side to cover the width of the drying belt.

According to one embodiment, the present drying system improves release of the dried product from the drying belt by chilling the drying belt at a final stage of the drying process. The difference in the coefficient of thermal expansion between the dried product and the drying belt fractures the adhering forces between the two surfaces. Chilling loosens the dried product from the drying belt and allows for efficient removal of the dried product from the drying belt.

According to one embodiment, the temperature of the chilled water used for cooling the drying belt and the dried product is at least 30° C. below the average drying temperature of the dried product and the drying belt. The present drying system may further cool the drying belt and the dried product to a temperature below 30° C., and preferably between 0° C. and 10° C.

According to one embodiment, the present drying system includes one or more high volume low pressure fans to exhaust a reduced volume of high humidity air directly out of the dryer. The fans eliminate the need for ducting and are installed with the dryer being properly oriented at an exterior building wall.

Figure 8:
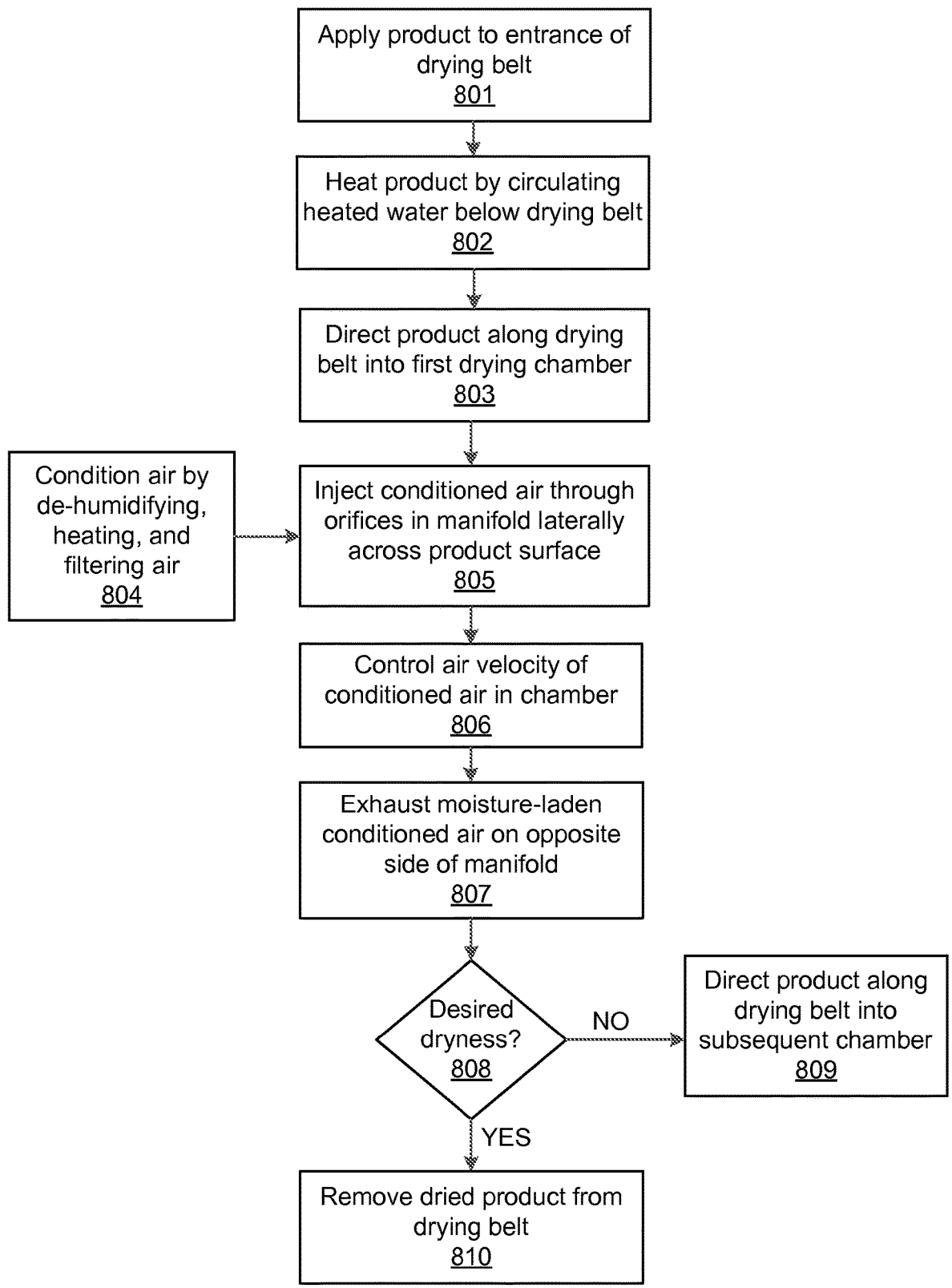
FIG. 8 illustrates an exemplary process for drying a product, according to one embodiment.

FIG. 8 illustrates an exemplary process for drying a product, according to one embodiment. The present drying system applies a product to be dried to an entrance of a conveyor drying belt at 801. The present drying system heats the product by circulating heated water or heat transfer fluid that is held in a bath below and in contact with the drying belt at 802. The present drying system directs the product along the drying belt into a first drying chamber of the dryer at 803. The present drying system provides conditioned air by de-humidifying, heating and filtering air at 804. The present drying system injects the conditioned air through one or more orifices in a manifold laterally across the product surface at 805. The manifold is positioned above and parallel to a first length of the drying belt such that the present drying system injects the conditioned air through the orifices across the width of the drying belt.

The present drying system controls an air velocity of the conditioned air in the chamber at 806. The present drying system exhausts the moisture-laden conditioned air on the opposite side of the manifold, i.e., along the second length of the drying belt at 807. The present drying system determines if a desired dryness for the product has been achieved at 808. If the product has reached a desired dryness, the present drying system continues to direct the product along the drying belt into a subsequent chamber of the dryer at 809. According to one embodiment, the air velocity of the conditioned air within the subsequent chamber is lower than the air velocity of the conditioned air within the first chamber. If the product has reached a desired dryness, the present drying system removes the dried product from the drying belt at 810. According to one embodiment, the present drying system removes the dried product by using a rod below the drying belt, where the rod has a sharp edge on one side and applies a force at an angle against the direction of the moving drying belt.

The components of the present drying system include materials that may be cleaned by using normal food processing chemicals and rinsing with tap water, according to one embodiment. These components of the present drying system may be easily removed from the dryer as they are mounted on key slots or studs that allow manipulation by a user. The air connections to the conditioned air distribution manifolds are of a quick disconnect type for easy installation and removal.

The above example embodiments have been described herein above to illustrate various embodiments of implementing a multi-chamber dryer using adjustable conditioned air flow has been disclosed. Various modifications and departures from the disclosed example embodiments will occur to those having ordinary skill in the art. The subject matter that is intended to be within the scope of the present disclosure is set forth in the following claims.

We claim:

1. An apparatus, comprising:
    a drying belt, wherein the drying belt floats on a body of water;
    one or more orifices disposed in a drying chamber for injecting conditioned air across a width of the drying belt to pick up moisture;
    a duct to discharge moisture laden air from the drying chamber, wherein the duct is parallel to a length of the drying belt and adjacent to an opposite edge of the drying belt; and
    a screen element disposed underneath the one or more orifices and extending beyond an edge of the drying belt, wherein the screen element guides a flow of the conditioned air from the one or more orifices, and wherein the screen element prevents the conditioned air from disturbing the water.

2. The apparatus of claim 1, wherein the drying belt is configured to receive a product to be dried.

3. The apparatus of claim 1, wherein the one or more orifices are defined by a manifold that is parallel to a length of the drying belt and adjacent to the edge of the drying belt.

4. The apparatus of claim 1, wherein the screen element prevents the conditioned air from disturbing a position of the drying belt.

5. The apparatus of claim 1, wherein the screen element prevents the conditioned air from flowing underneath the edge of the drying belt.

6. The apparatus of claim 1, wherein a first end of the screen element is attached to a sidewall of the drying chamber and a second end of the screen element is disposed over the drying belt.

7. The apparatus of claim 1, further comprising a filter and one or more of a chiller, a solid absorbent, or a compressor to provide the conditioned air.

8. The apparatus of claim 1, further comprising a cover that covers and provides an adjustable headspace above the drying belt.

9. A method, comprising:
    disposing a product on a surface of a drying belt, wherein the drying belt floats on a body of water;
    injecting conditioned air from one or more orifices disposed in a drying chamber, wherein
    the conditioned air is injected across a width of the drying belt to pick up moisture, and wherein a flow of the conditioned air is guided by a screen element disposed underneath the one or more orifices and
    extending beyond an edge of the drying belt, and wherein the screen element prevents the conditioned air from disturbing the water under the drying belt;
    exhausting moisture laden air from the drying chamber using a duct, wherein the duct is parallel to a length of the drying belt and adjacent to an opposite edge of the drying belt; and
    removing the product from the drying belt.

10. The method of claim 9, wherein the one or more orifices are defined by a manifold that is parallel to a length of the drying belt and adjacent to the edge of the drying belt.

11. The method of claim 9, wherein injecting the conditioned air comprises using the screen element to prevent the conditioned air from disturbing a position of the drying belt.

12. The method of claim 9, wherein injecting the conditioned air comprises using the screen element to prevent the conditioned air from flowing underneath the edge of the drying belt.

13. The method of claim 9, wherein a first end of the screen element is attached to a sidewall of the drying chamber and a second end of the screen element is disposed over the drying belt.

14. The method of claim 9, further comprising dehumidifying the conditioned air using one or more of a chiller, a solid absorbent, or a compressor.

* * * * *